United States Patent
Santoro et al.

(10) Patent No.: US 9,667,516 B2
(45) Date of Patent: *May 30, 2017

(54) INTEGRATED ADAPTIVE ANYCAST FOR CONTENT DISTRIBUTION

(71) Applicant: AT&T INTELLECTUAL PROPERTY I, L.P., Atlanta, GA (US)

(72) Inventors: Mario A. Santoro, Colts Neck, NJ (US); Herani Brotman, Colts Neck, NJ (US); Alan L. Glasser, Manalapan, NJ (US); James Miros, Little Silver, NJ (US); Oliver Spatscheck, Randolph, NJ (US); Jacobus E. Van der Merwe, Salt Lake City, UT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,618

(22) Filed: Oct. 2, 2015

(65) Prior Publication Data

US 2016/0028600 A1 Jan. 28, 2016

Related U.S. Application Data

(63) Continuation of application No. 14/053,884, filed on Oct. 15, 2013, now Pat. No. 9,191,292, which is a (Continued)

(51) Int. Cl.
*H04L 12/26* (2006.01)
*H04L 29/12* (2006.01)
(Continued)

(52) U.S. Cl.
CPC ........ *H04L 43/08* (2013.01); *H04L 29/12066* (2013.01); *H04L 45/126* (2013.01);
(Continued)

(58) Field of Classification Search
CPC ......... H04L 29/12; H04L 29/08; H04L 12/26; H04L 61/2007; H04L 29/12066;
(Continued)

(56) References Cited

U.S. PATENT DOCUMENTS 5,822,320 A 10/1998 Horikawa et al.
6,236,652 B1 5/2001 Preston et al.
(Continued)

OTHER PUBLICATIONS

Hussein et al., "Anycast CDNs Revisited," Case Western Reserve University, Cleveland OH, AT&T Labs—Research, Florham Park NJ 07932, WWW 2008, Beijing China, Apr. 21-25, 2008, pp. 277-286.

*Primary Examiner* — Benjamin M Thieu
(74) *Attorney, Agent, or Firm* — Akerman LLP; Michael K. Dixon; Mammen (Roy) P. Zachariah, Jr.

(57) ABSTRACT

A system including first and second servers, a domain server, and a route controller is disclosed. The first and second servers are configured to respond to an anycast address and to first and second unicast addresses respectively. The route controller is configured to determine whether the first cache server is non-overloaded, overloaded, or offline, and may instruct the domain name server to provide to provide the second unicast address when the status is overloaded or offline. Routing of the anycast address may be modified so as to direct a content request sent to the anycast address to the second cache server when the status is offline. The domain name server may receive a request for a cache server address and provide the anycast address to the requestor when the status is non-overloaded, and provide the second unicast address when the status is offline or overloaded.

20 Claims, 9 Drawing Sheets

Related U.S. Application Data continuation of application No. 12/645,006, filed on Dec. 22, 2009, now Pat. No. 8,560,598.

(51) Int. Cl.
 *H04L 12/733* (2013.01)
 *H04L 29/08* (2006.01)

(52) U.S. Cl.
 CPC ...... *H04L 61/1511* (2013.01); *H04L 61/2007* (2013.01); *H04L 67/1002* (2013.01); *H04L 67/1008* (2013.01); *H04L 67/1021* (2013.01)

(58) Field of Classification Search
 CPC ............... H04L 67/1008; H04L 45/126; H04L 67/1021; H04L 43/08; H04L 61/1511; H04L 67/1002
 See application file for complete search history.

(56) References Cited

U.S. PATENT DOCUMENTS

| | | | |
|---|---|---|---|
| 6,327,252 | B1 | 12/2001 | Silton et al. |
| 6,687,731 | B1 | 2/2004 | Kayak |
| 6,920,129 | B2 | 7/2005 | Preston et al. |
| 7,254,138 | B2 | 8/2007 | Sandstrom |
| 7,328,009 | B2 | 2/2008 | Takeda et al. |
| 7,330,906 | B2 | 2/2008 | Hameleers et al. |
| 7,343,422 | B2 | 3/2008 | Garcia-Luna-Aceves et al. |
| 7,797,426 | B1 | 9/2010 | Lyon |
| 8,156,214 | B2 | 4/2012 | Prasad et al. |
| 8,176,203 | B1 | 5/2012 | Liu et al. |
| 8,265,073 | B2 * | 9/2012 | Brzozowski ........ H04L 12/2801 370/254 |
| 8,296,458 | B2 * | 10/2012 | Kwapniewski ... H04L 29/12066 709/220 |
| 2001/0016492 | A1 * | 8/2001 | Igarashi .................. H04L 63/08 455/433 |
| 2002/0004846 | A1 | 1/2002 | Garcia-Luna-Aceves et al. |
| 2002/0016860 | A1 | 2/2002 | Garcia-Luna-Aceves et al. |
| 2002/0073232 | A1 | 6/2002 | Hong et al. |
| 2003/0051016 | A1 | 3/2003 | Miyoshi |
| 2003/0079027 | A1 | 4/2003 | Slocombe et al. |
| 2003/0182410 | A1 | 9/2003 | Balan et al. |
| 2003/0193958 | A1 | 10/2003 | Narayanan |
| 2004/0107234 | A1 | 6/2004 | Rajahalme |
| 2004/0143662 | A1 | 7/2004 | Poyhonen et al. |
| 2004/0146045 | A1 | 7/2004 | Jimmei et al. |
| 2004/0165565 | A1 | 8/2004 | Omae et al. |
| 2005/0010653 | A1 | 1/2005 | McCanne |
| 2005/0164729 | A1 | 7/2005 | Narayanan et al. |
| 2005/0198367 | A1 | 9/2005 | Ettikan |
| 2005/0206241 | A1 * | 9/2005 | Saxena ..................... H02J 9/06 307/66 |
| 2006/0018299 | A1 | 1/2006 | Yamamoto |
| 2006/0018317 | A1 | 1/2006 | Jimmei |
| 2006/0064478 | A1 * | 3/2006 | Sirkin ............... H04L 29/12066 709/223 |
| 2006/0112176 | A1 * | 5/2006 | Liu .................... H04L 29/12066 709/245 |
| 2006/0193252 | A1 | 8/2006 | Naseh et al. |
| 2006/0209885 | A1 | 9/2006 | Hain et al. |
| 2006/0221866 | A1 | 10/2006 | Shepherd |
| 2006/0236394 | A1 | 10/2006 | Morrow et al. |
| 2007/0030818 | A1 * | 2/2007 | Bahnck ................. H04L 12/18 370/270 |
| 2007/0088708 | A1 | 4/2007 | Vijayarajan |
| 2007/0133539 | A1 | 6/2007 | Kang et al. |
| 2007/0243821 | A1 | 10/2007 | Hundscheidt et al. |
| 2007/0286209 | A1 * | 12/2007 | Wang ................ H04L 29/12028 370/395.54 |
| 2007/0294419 | A1 | 12/2007 | Ulevitch |
| 2008/0005290 | A1 | 1/2008 | Nykanen et al. |
| 2008/0080513 | A1 | 4/2008 | Kang et al. |
| 2008/0123640 | A1 | 5/2008 | Bhatia et al. |
| 2008/0126529 | A1 | 5/2008 | Kim et al. |
| 2008/0168066 | A1 | 7/2008 | Ruiz-Velasco et al. |
| 2008/0235400 | A1 | 9/2008 | Slocombe et al. |
| 2009/0144380 | A1 | 6/2009 | Kallman et al. |
| 2009/0164661 | A1 * | 6/2009 | Kim .................... H04L 29/12066 709/238 |
| 2010/0274970 | A1 * | 10/2010 | Treuhaft .......... H04L 29/12066 711/118 |

* cited by examiner

INTEGRATED ADAPTIVE ANYCAST FOR CONTENT DISTRIBUTION

CROSS REFERENCE TO RELATED APPLICATIONS

This application claims priority to and is a continuation of U.S. patent application Ser. No. 14/053,884, filed on Oct. 15, 2013, which is a continuation of U.S. patent application Ser. No. 12/645,006, filed on Dec. 22, 2009, now U.S. Pat. No. 8,560,598, the disclosures of which are hereby incorporated by reference in their entireties.

FIELD OF THE DISCLOSURE

The present disclosure generally relates to communications networks, and more particularly relates to integrated adaptive anycast for content distribution.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
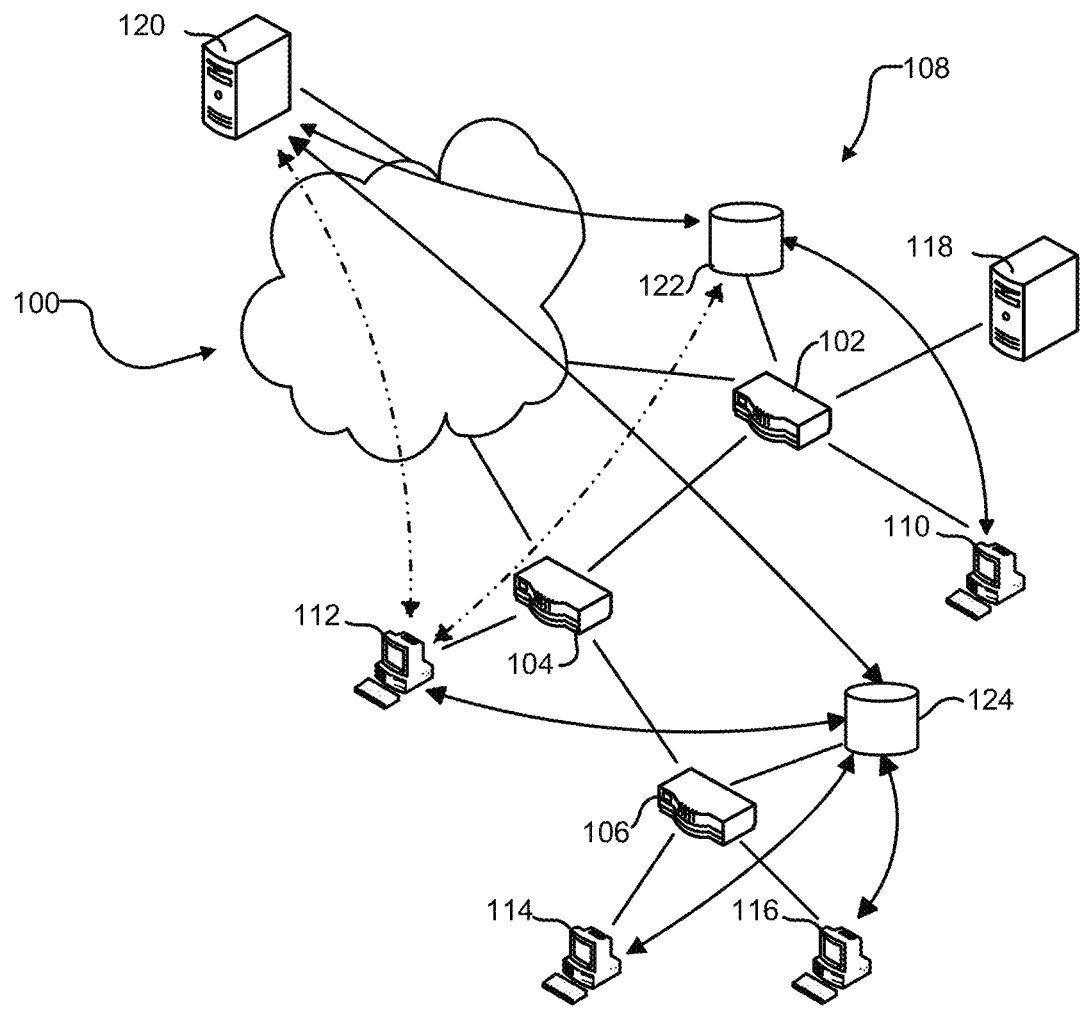
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106.

Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
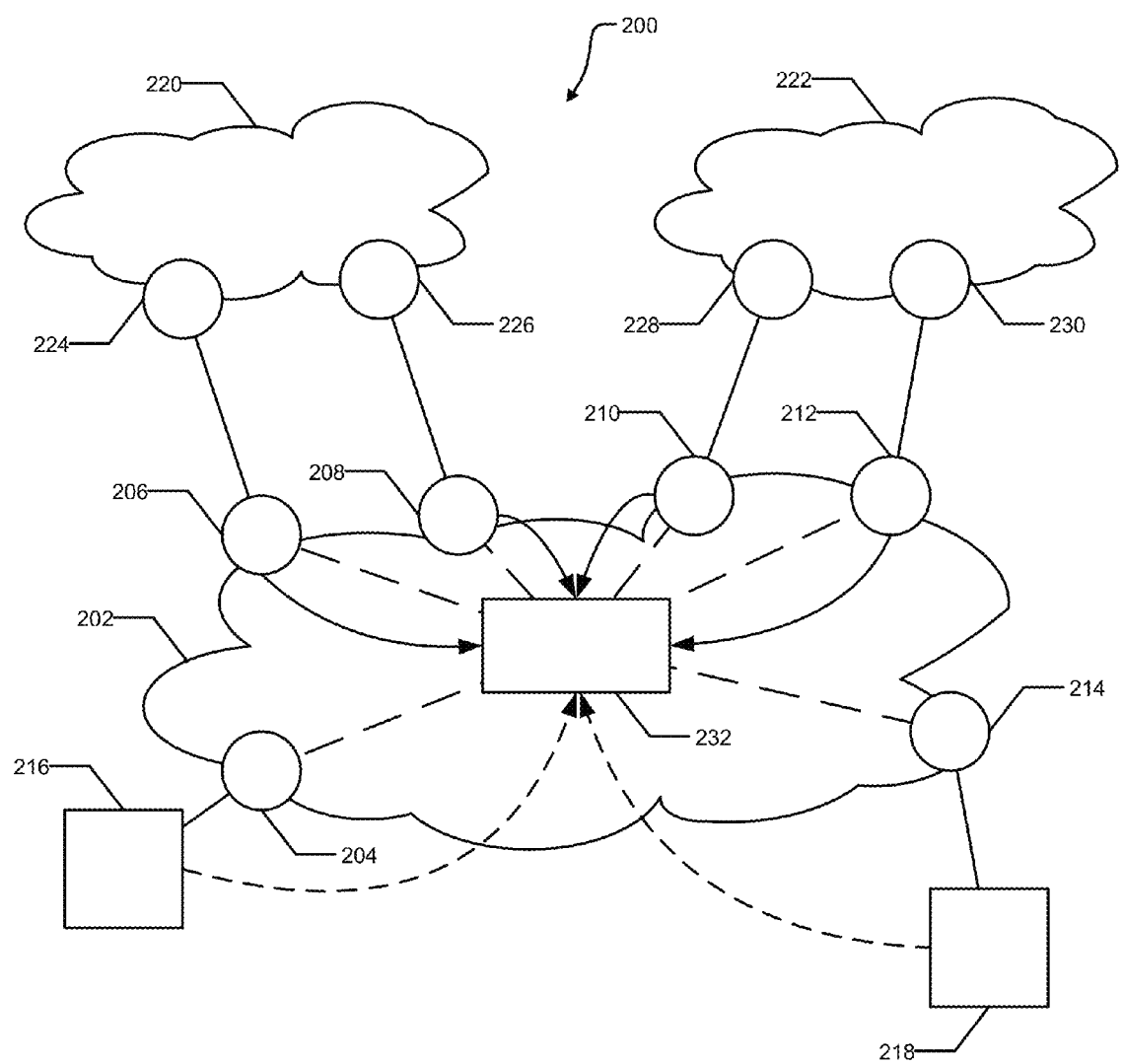
FIG. 2 is a block diagram illustrating an anycast CDN system in accordance with an embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218. The load information can include available bandwidth, bandwidth utilization, CPU utilization, memory utilization, number of requests being served, and the like.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206, 208, 210, and 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

Figure 3:
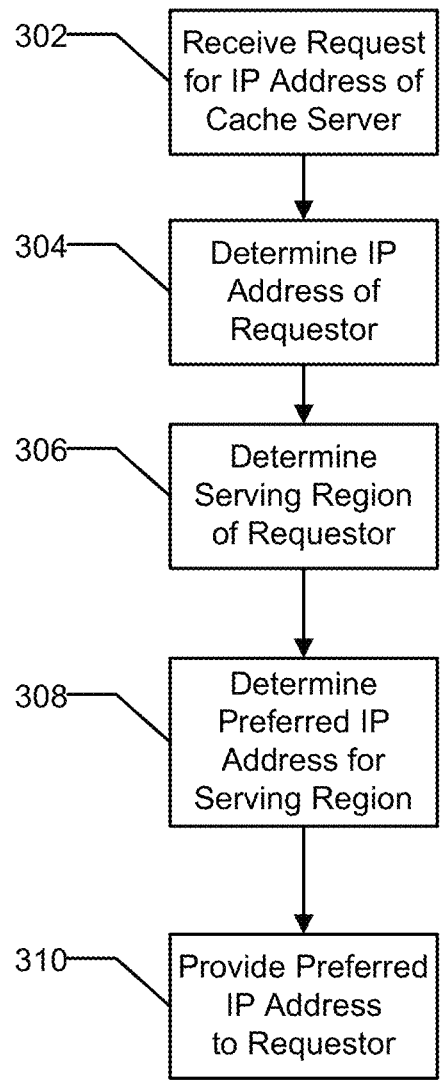
FIG. 3 is a flow diagram illustrating an exemplary method of providing an Internet Protocol (IP) address in accordance with an embodiment of the present disclosure.

FIG. 3 illustrates an exemplary method of providing an IP address in response to a DNS hostname resolution request. At 302, a system can receive an address request, such as at DNS server 118, for an IP address from a requestor, such as from a local DNS server or a client system. At 304, the system can determine the IP address of the requestor, such as the source IP of the address request. At 306, the system can determine a serving region for the requestor. In an embodiment, requestors connecting to the content delivery network through the same ingress point can belong to the same serving region. Specifically, in an anycast mode, content requests entering the content delivery network from the same ingress point can be served by the same cache server, such as cache server 122.

At 308, the system can determine a preferred IP address for the serving region, and at 310 the system can provide the preferred address to the requestor. When the cache servers are not in an overloaded state, the preferred IP address can be an anycast IP address for the cache servers. Alternatively, when the cache servers are in an overloaded state, or more specifically when the serving region cache server (the cache server responding to content requests from the serving region) is in an overloaded state, the preferred address can be a unicast IP address directing the requests to an alternate cache server that is not in an overloaded state. In this way, the system can direct requests away from overloaded cache servers. Additionally, when the serving region cache server is offline, the preferred address can be a unicast IP address directing the requests from the serving region to an alternate cache server.

Figure 4:
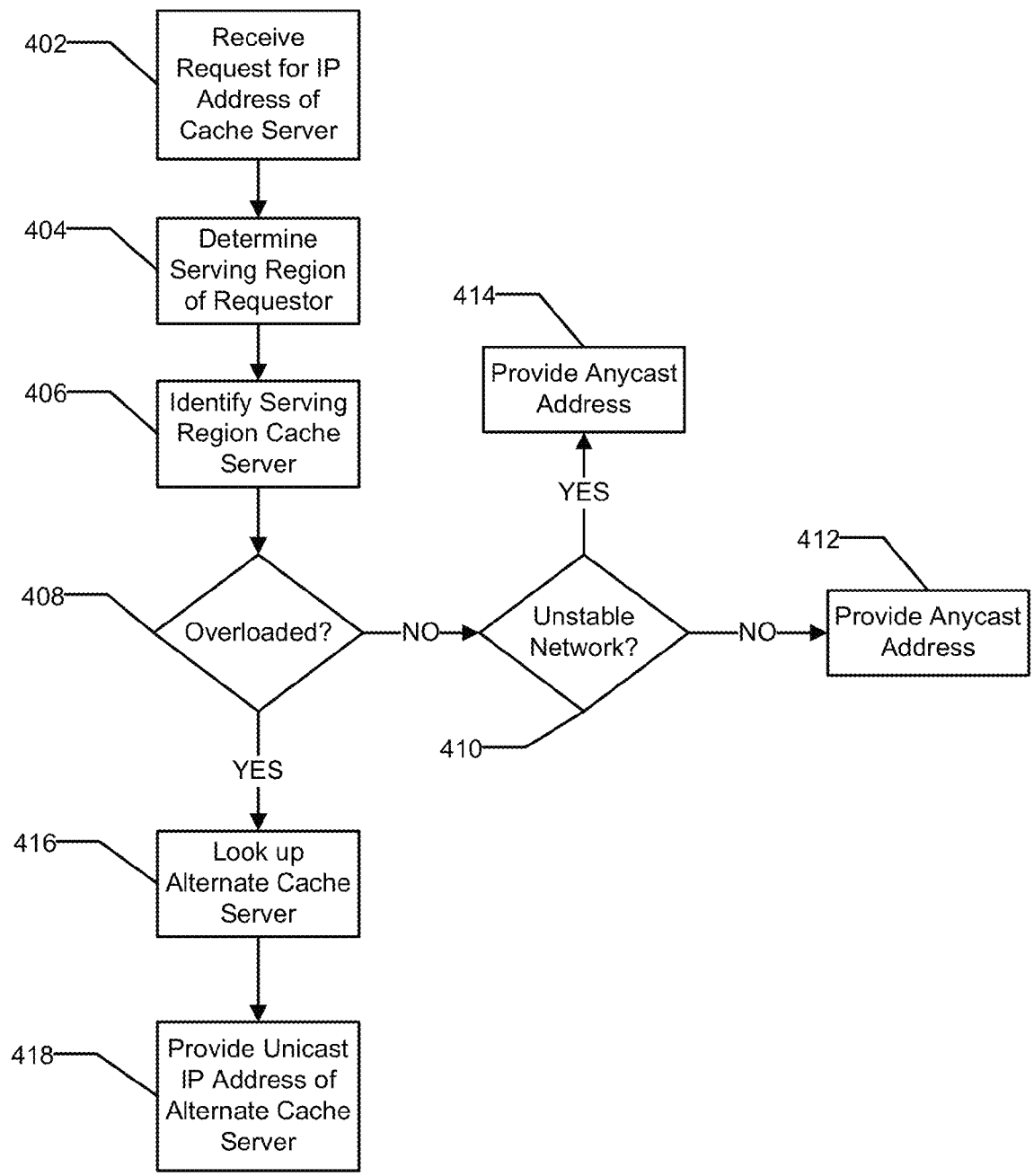
FIG. 4 is a flow diagram illustrating another exemplary method of providing an IP address in accordance with an embodiment of the present disclosure.

FIG. 4 illustrates another exemplary method of providing an IP address in response to a DNS hostname resolution request. At 402, the system can receive an address request for an IP address of a cache server. At 404, the system can determine a serving region for the requestor. The system may use the source IP address of the request to determine the serving region. At 406, the system can identify the serving region cache server associated with the serving region. The serving region cache server can be the cache server that responds to content requests sent to the anycast IP address from client systems within the serving region.

At 408, the system can determine if the serving region cache server is overloaded. The serving region cache server can be in an overloaded state when the load of the serving region cache server exceeds a threshold, such as 80% of the available capacity of the cache server. It should be recognized that other threshold levels are within the scope of this disclosure. Additionally, the threshold may be adjusted based on the variability of the load on the serving region cache server. For example, if the load typically changes by more than 10% over a relatively short time period, the threshold can be decreased to 70% of the available capacity of the cache server.

At 410, when the serving region cache server is not overloaded, the system can determine if the serving region includes an unstable network. An unstable network can includes an autonomous system that is subject to frequent internal routing changes. As such, the ingress point for client systems within the serving region can change, resulting in disruptions to connections established by sending a request to an anycast address.

At 412, when the serving region does not include an unstable network, the system can provide the anycast IP address in response to the address request. Alternatively, when the serving region includes an unstable network, the system can provide a unicast address corresponding to the serving region cache server in response to the address request, as illustrated at 414.

Returning to 408, when the serving region cache server is overloaded, the system can look up the unicast address of an alternate cache server, as illustrated at 416. The alternate cache server can be a cache server that has a relatively low network cost for serving content to the serving region. However, the alternate cache server can have a network cost that is higher than the serving region cache server. Generally, the alternate cache server with a relatively low network cost can be relatively close to the ingress point for the serving region. However, the alternate cache server can be further from the ingress point than the serving region cache server. Additionally, the alternate cache server can be a cache server that is not overloaded. At 418, the system can provide a unicast IP address associated with the alternate cache server in response to the address request.

In an embodiment, the system can determine if the serving region cache server is in a pre-overloaded state. For example, the serving region cache server can be in a pre-overloaded state when the load of the serving region cache server exceeds a pre-overload threshold but does not exceed an overload threshold. For example, the pre-overload threshold can be about 60% of the available capacity of the cache server and the overload threshold can be about 80% of the available capacity. It should be recognized that other threshold levels are within the scope of this disclosure. Additionally, the pre-overload threshold and the overload threshold may be adjusted based on the variability of the load on the serving region cache server. When the serving region cache server is in a pre-overloaded state, the system can provide the anycast address to a portion of the address requests and the unicast address of the alternate cache server to another portion of the address requests. In this way, the system can more smoothly transition a portion of the content requests to the alternate cache server and avoid a condition in which the load is shifted back and forth between the serving region cache server and the alternate cache server. In a particular embodiment, the ratio of the address requests receiving the anycast address to the address requests receiving the unicast address can decrease as the service region cache server approaches 80% of the available capacity.

In an embodiment, a group of alternate cache server may be preselected for the serving region. The unicast address provided can depend on the load for each of the alternate cache servers. For example, the group of alternate cache servers can include primary and secondary alternate cache servers. When the primary cache server is not in an overloaded state, the unicast address provided can correspond to the primary cache server. Alternatively, when the primary cache server is in an overloaded state, the unicast address provided can correspond to the secondary cache server. In a particular embodiment, when all the alternate cache servers are in an overloaded state, unicast addresses for each of the alternate cache servers can be provided in a round-robin fashion to distribute content requests to all of the alternate cache server.

Figure 5:
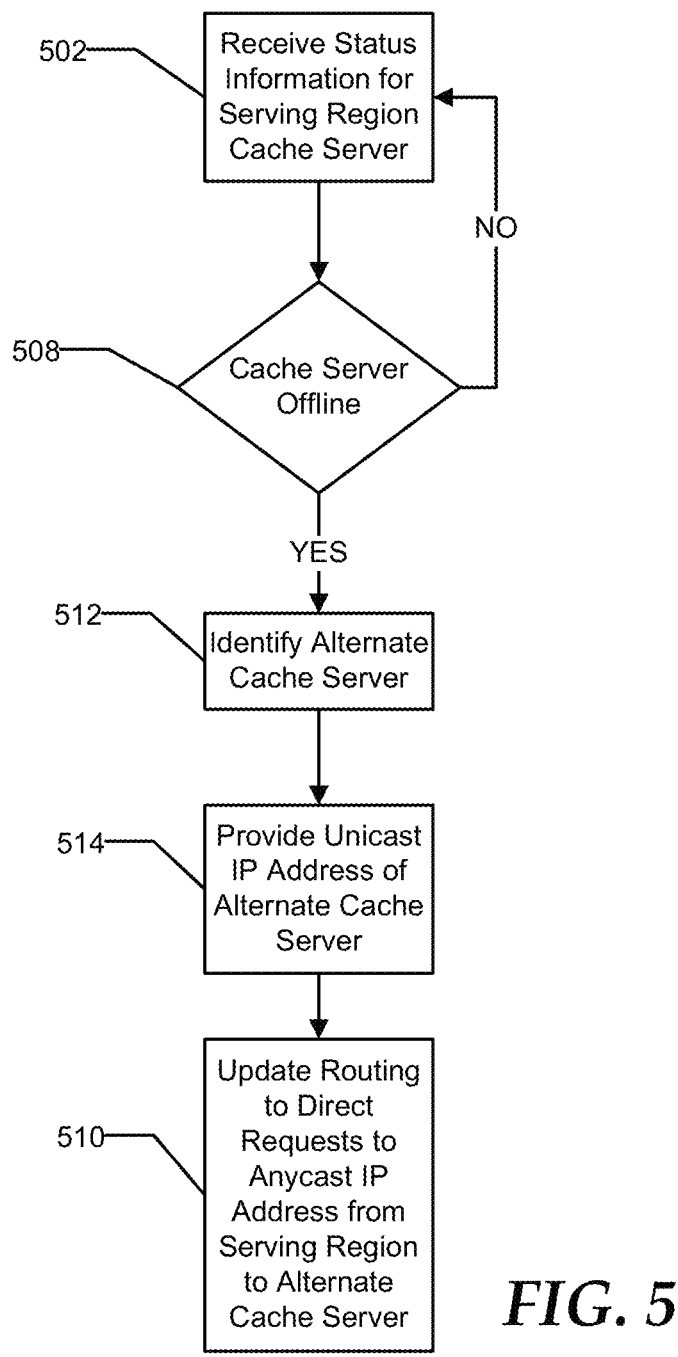
FIG. 5 is a flow diagram illustrating an exemplary method of redirecting requests in accordance with an embodiment of the present disclosure.

FIG. 5 illustrates an exemplary method of redirecting requests in accordance with an embodiment of the present disclosure. At 502, a system can receive status information from the serving region cache server. At 504, the system can determine if the serving region cache server is in an offline state. For example, the serving region cache server can periodically send a notification to the system. When the system does not receive the expected notification, the system can determine that the serving region cache server is in an offline state. The serving region cache server may be offline due to an unexpected failure or as a result of scheduled maintenance.

When the serving region cache server is not offline, the system can continue to receive status information from the serving region cache server at 402. Alternatively, when the serving region cache server is offline, the system can identify an alternate cache server, as illustrated at 506. At 508, the system can provide the unicast address of the alternate cache server in response to requests for an address associated with the CDN. At 510, the system can update the routing to direct content requests sent to the anycast address from the serving region to the alternate cache server. In this way, client systems from the serving region can continue to receive service even when the client system or a DNS server has cached the anycast address.

Figure 6:
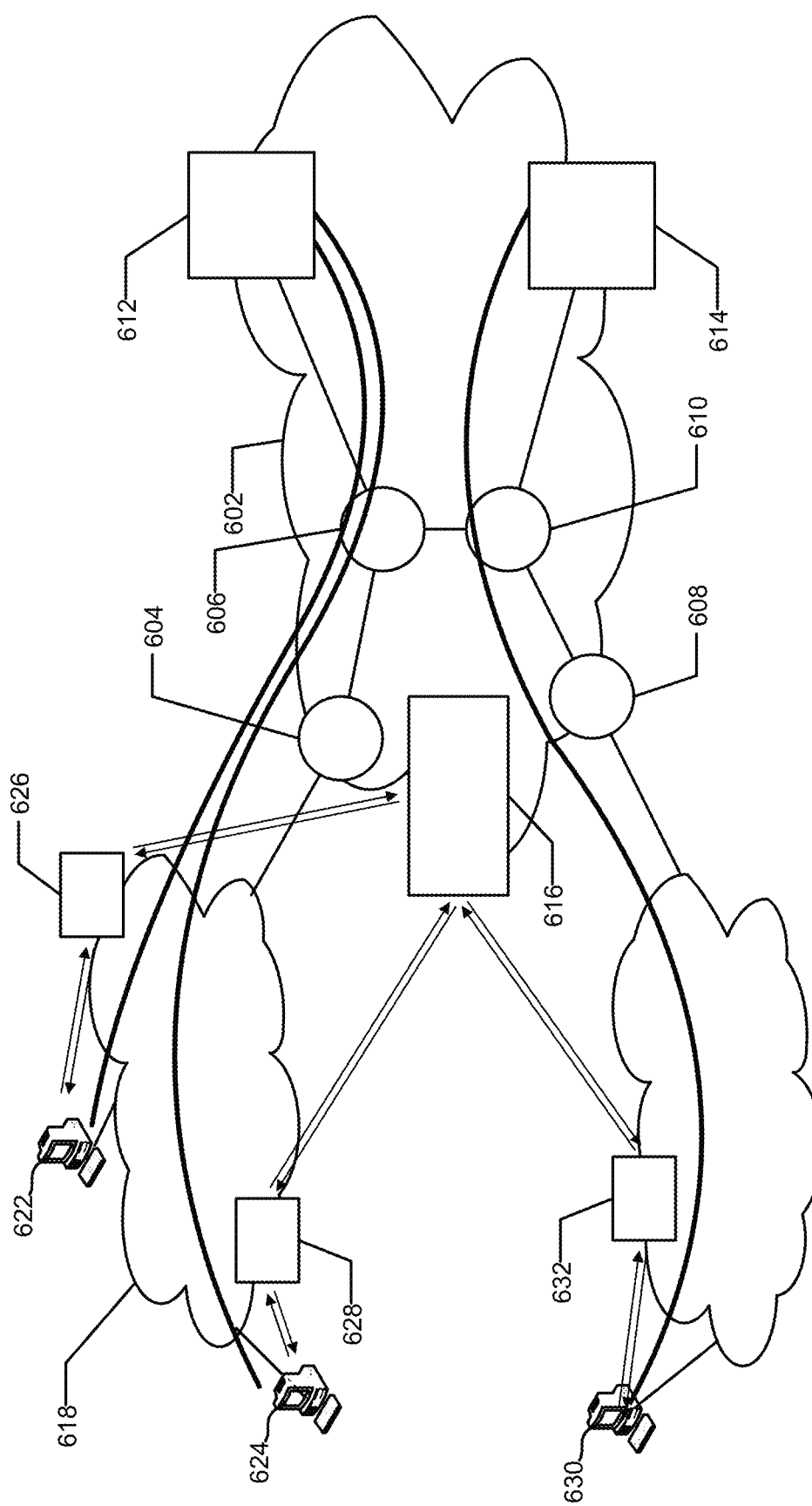
FIGS. 6, 7, and 8 are block diagrams illustrating the behavior of an exemplary anycast CDN system in accordance with embodiments of the present disclosure.
Figure 7:
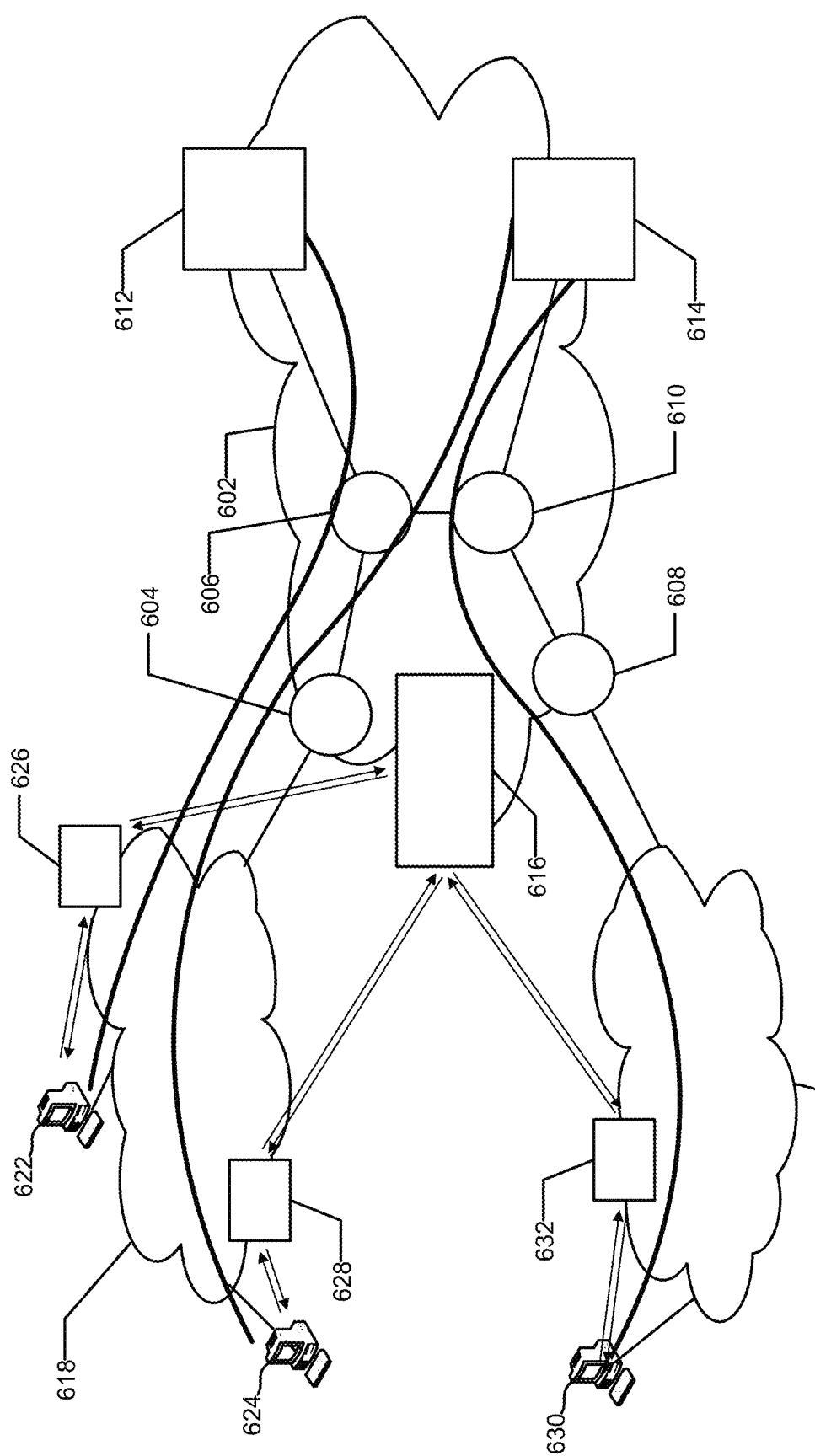
Figure 8:
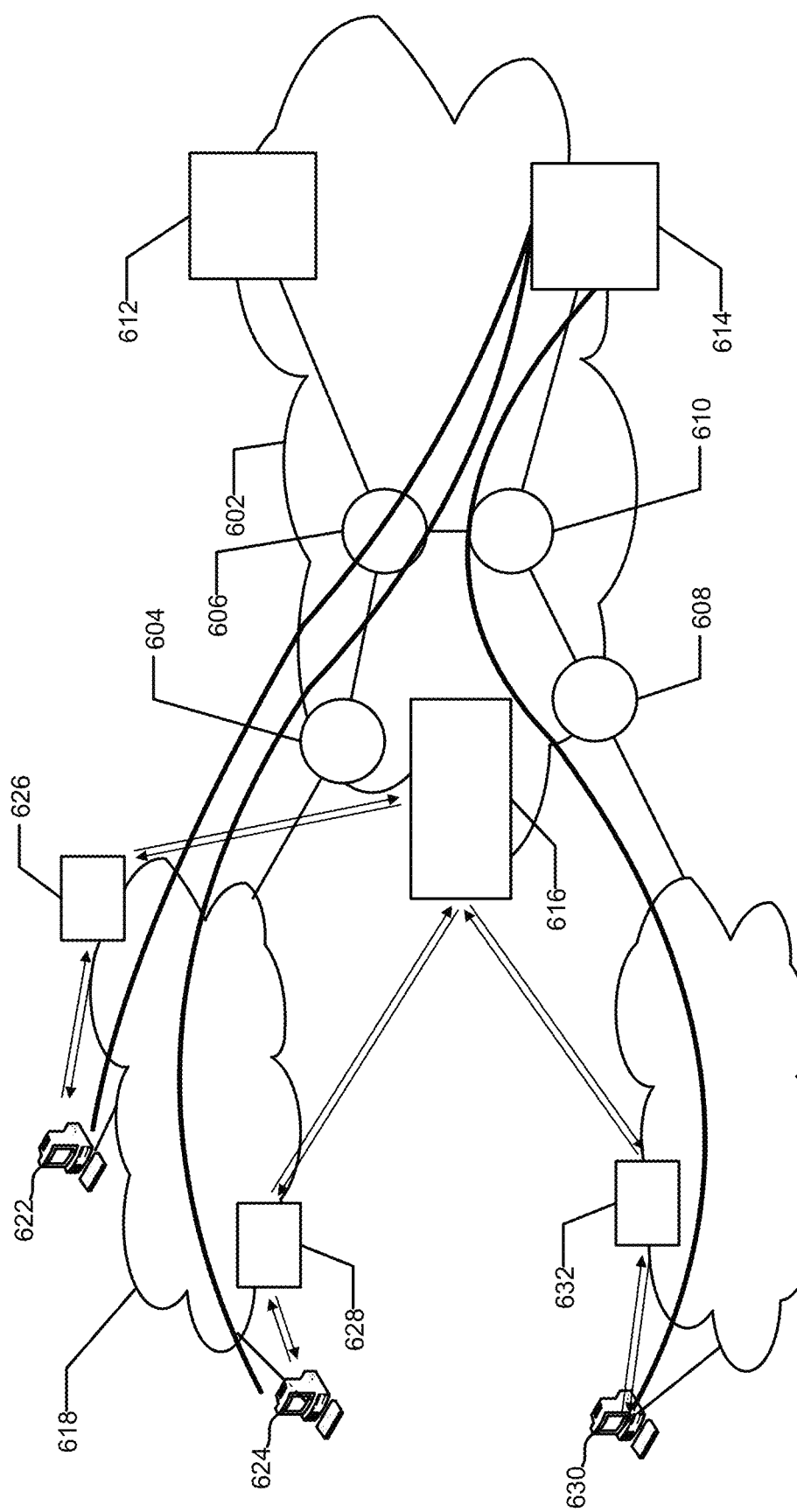

FIGS. 6, 7, and 8 are block diagrams illustrating the behavior of an exemplary embodiment of a system 600 during a non-overloaded condition and an overload condition. Backbone network 602 can includes routers 604, 606, 608, and 610, cache servers 612 and 614, and DNS server 616. Backbone network 602 can be connected to access network 618 through router 604 and to access network 620 through router 608. Access network 618 can include client systems 622 and 624 and local DNS servers 626 and 628. Similarly, access network 620 can include client system 630 and local DNS server 632.

Referring to FIG. 6, during the non-overloaded condition, the preferred IP address for all serving regions is the anycast address. The anycast address allows the routers 604, 606, 608, and 610 to automatically direct traffic to the least cost cache server 612 or 614. Specifically, client system 622 can request an IP address for a cache server from local DNS server 626. Local DNS server 626 can send a request to DNS server 616 for the IP address. DNS server 616 can provide the anycast IP address in response to the query to local DNS server 626, and ultimately to client system 622. Similarly, the anycast IP address can be provided to client systems 624 and 630.

Upon receiving the anycast IP address, client system 622 can send a content request to the anycast IP address. Because client system 622 is within access network 618, corresponding to a first serving region, content requests from client system 622 can be directed along routers 604 and 606 to reach cache server 612. Similarly, content requests from client 624, also located within access network 618, can be directed to cache server 612. Alternately, content requests from client system 630 can be directed along routers 608 and 610 to cache server 614 as client system 630 is within access network 620 which can belong to a second serving region.

Referring to FIG. 7, when cache server 612 is overloaded, DNS server 616 can provide unicast IP addresses to at least a portion of the requests from the first serving region. Specifically, client system 624 can request an IP address from local DNS server 628. Local DNS server 628 can request an IP address from DNS server 616. DNS server 616, in response to the overload condition at cache server 612, can provide a unicast IP address associated with cache server 614 to local DNS server 628. Requests from client system 624 can then be directed to cache server 614, bypassing the anycast routing and redirecting at least a portion of the traffic from the first serving region away from overloaded cache server 612 to the alternate cache server 614.

Referring to FIG. 8, when cache server 612 is offline, DNS server 616 can provide unicast IP addresses in response to address requests from the first serving region similar to when the serving region cache server is overloaded as previously discussed. Additionally, the routing can be modified to direct content requests from access network 618 to cache server 614. Specifically, client system 624 can request an IP address from local DNS server 628. When local DNS server 628 has the anycast IP address stored in a cache, local DNS server 628 can provide the anycast IP address to client system 624. Content requests from client system 624 to the anycast address can then be directed to cache server 614 by the network infrastructure to avoid content requests going to cache server 612 at least until cache server 612 is back online.

Figure 9:
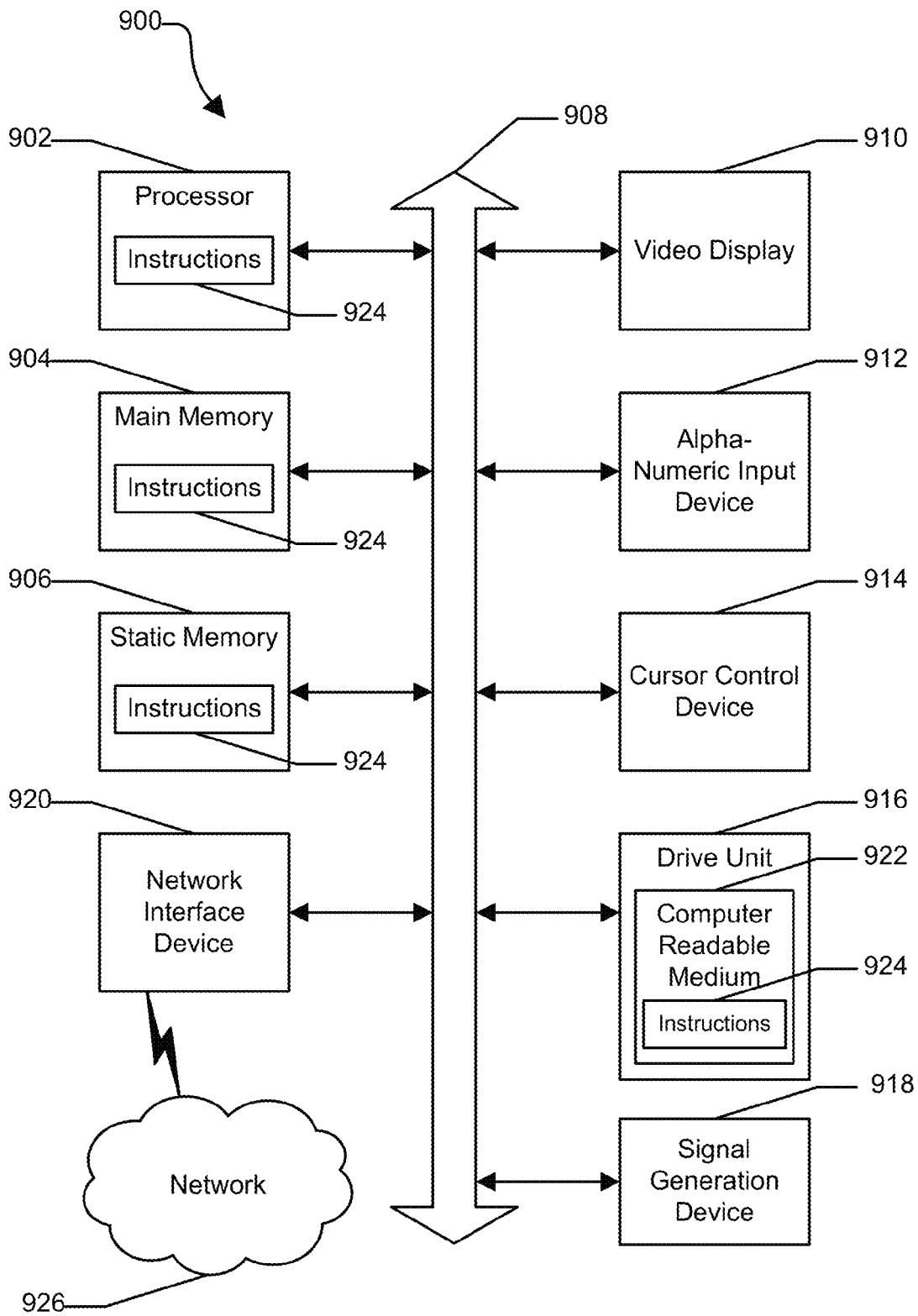
FIG. 9 is an illustrative embodiment of a general computer system.

FIG. 9 shows an illustrative embodiment of a general computer system 900. The computer system 900 can include a set of instructions that can be executed to cause the computer system to perform any one or more of the methods or computer based functions disclosed herein. The computer system 900 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910 such as a liquid crystal display (LCD), an organic light emitting diode (OLED), a flat panel display, a solid-state display, or a cathode ray tube (CRT). Additionally, the computer system 900 may include an input device 912 such as a keyboard, and a cursor control device 914 such as a mouse. Alternatively, input device 912 and cursor control device 914 can be combined in a touchpad or touch sensitive screen. The computer system 900 can also include a disk drive unit 916, a signal generation device 918 such as a speaker or remote control, and a network interface device 920 to communicate with a network 926. In a particular embodiment, the disk drive unit 916 may include a computer-readable medium 922 in which one or more sets of instructions 924, such as software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a memory that stores instructions;
   a processor that executes the instructions to perform operations, the operations comprising:
      identifying a serving region for a requestor associated with a content request based on determining that the requestor is connecting through a same ingress point of a content delivery network as other requestors belonging to the serving region;
      instructing, when a status of a first cache server of the serving region is determined to be an offline status, a domain name server to provide a unicast address for a second cache server; and
      modifying, when the status of the first cache server is determined to be the offline status, routing of an anycast address to direct the content request that is sent to the anycast address to the unicast address of the second cache server.

2. The system of claim 1, wherein the operations further comprise determining the status of the first cache server.

3. The system of claim 1, wherein the operations further comprise identifying the second cache server.

4. The system of claim 1, wherein the operations further comprise determining that the first cache server has the offline status when a notification is not received from the first cache server.

5. The system of claim 1, wherein the operations further comprise determining that the first cache server has the offline status based on detection of a failure associated with the first cache server.

6. The system of claim 1, wherein the operations further comprise determining that the first cache server has the offline status based on detection of a scheduled maintenance associated with the first cache server.

7. The system of claim 1, wherein the operations further comprise receiving a request for an address of the first cache server.

8. The system of claim 1, wherein the operations further comprise determining that the status of the first cache server has an overloaded status when a load of the first cache server exceeds a threshold.

9. The system of claim 1, wherein the operations further comprise determining that the status of the first cache server has a non-overloaded status when a load of the first cache server does not exceed a threshold.

10. The system of claim 1, wherein the operations further comprise determining if the status of the first cache server has a pre-overloaded status, wherein the first cache server has the pre-overloaded status if the first cache server has a load that exceeds a pre-overload threshold, but does not exceed an overload threshold.

11. The system of claim 1, wherein the operations further comprise determining a different serving region for a different requestor associated with a different the content request.

12. The system of claim 11, wherein the operations further comprise determining if a third cache server belongs to the different serving region.

13. A method, comprising:
   identifying a serving region for a requestor associated with a content request based on determining that the requestor is connecting through a same ingress point of a content delivery network as other requestors belonging to the serving region;
   instructing, when a status of a first cache server of the serving region is determined to be an offline status and by utilizing instructions from a memory that are executed by a processor, a domain name server to provide a unicast address for a second cache server; and
   causing, when the status of the first cache server is determined to be the offline status, the content request that is sent to the anycast address to be directed to the unicast address of the second cache server.

14. The method of claim 13, further comprising determining the status of the first cache server.

15. The method of claim 13, further comprising determining that the first cache server has the offline status based on detection of a failure associated with the first cache server.

16. The method of claim 13, further comprising determining that the first cache server has the offline status based on detection of a scheduled maintenance associated with the first cache server.

17. The method of claim 13, further comprising determining that the first cache server has the offline status when a notification is not received from the first cache server.

18. The method of claim 13, further comprising determining if the serving region of the requestor associated with the content request includes an unstable network.

19. The method of claim 18, further comprising providing the unicast address for the second cache server when the serving region includes the unstable network.

20. A method, comprising:
   identifying a serving region for a requestor associated with a content request based on determining that the requestor is connecting through a same ingress point of a content delivery network as other requestors belonging to the serving region;
   receiving an instruction to provide a unicast address of an alternate cache server to the requestor when a status of a first cache server of the serving region is determined to be an offline status, wherein the first cache server serves content requests sent to an anycast address from the serving region of the requestor; and transmitting, based on the instruction, the unicast address of the alternate cache server to the requestor in response to an address request when the status of the first cache server is the offline status.

\* \* \* \* \*